United States Patent
Chang et al.

(10) Patent No.: US 10,901,491 B2
(45) Date of Patent: Jan. 26, 2021

(54) SLEEP MANAGEMENT METHOD AND DEVICE, AND COMPUTER STORAGE MEDIUM

(71) Applicant: ONEPLUS TECHNOLOGY (SHENZHEN) CO., LTD., Shenzhen (CN)

(72) Inventors: Wenyen Chang, Shenzhen (CN); Zongjheng Pai, Shenzhen (CN)

(73) Assignee: ONEPLUS TECHNOLOGY (SHENZHEN) CO., LTD., Shenzhen (CN)

(*) Notice: Subject to any disclaimer, the term of this patent is extended or adjusted under 35 U.S.C. 154(b) by 303 days.

(21) Appl. No.: 16/304,729

(22) PCT Filed: May 26, 2017

(86) PCT No.: PCT/CN2017/086226
§ 371 (c)(1),
(2) Date: Nov. 27, 2018

(87) PCT Pub. No.: WO2017/206816
PCT Pub. Date: Dec. 7, 2017

(65) Prior Publication Data
US 2020/0326770 A1    Oct. 15, 2020

(30) Foreign Application Priority Data
May 31, 2016   (CN) .......................... 2016 1 0377374

(51) Int. Cl.
*G06F 9/54*   (2006.01)
*G06F 1/3287*   (2019.01)
(Continued)

(52) U.S. Cl.
CPC .......... *G06F 1/3287* (2013.01); *G06F 1/3228* (2013.01); *G06F 9/542* (2013.01); *G06F 9/544* (2013.01)

(58) Field of Classification Search
CPC ...... G06F 1/3287; G06F 1/3228; G06F 9/542; G06F 9/544; G06F 9/485; G06F 9/48; G06F 9/4881
(Continued)

(56) References Cited

U.S. PATENT DOCUMENTS 6,848,054 B1   1/2005   Watts, Jr.
7,256,788 B1   8/2007   Luu
(Continued)

FOREIGN PATENT DOCUMENTS

CN   101025913 A   8/2007
CN   101312519 A   11/2008
(Continued)

OTHER PUBLICATIONS

International Search Report in international application No. PCT/CN2017/086226, dated Sep. 1, 2017.
(Continued)

*Primary Examiner* — Michael J Brown
(74) *Attorney, Agent, or Firm* — Syncoda LLC; Feng Ma (57) ABSTRACT

Provided are a sleep management method and device, and a computer storage medium. The method includes that: after completion of a drawing task in a current frame, preparing a drawing buffer region for a drawing task in a next frame; after completion of preparation of the drawing buffer region, estimating a sleep delay time D; and after waiting for the sleep delay time D to elapse, transmitting an end notification to wake up an application in a sleeping state. Compared with the prior art techniques, the method of the invention transmits an end notification after predicting and waiting for a
(Continued)

sleep time delay D to elapse rather than transmitting an end notification immediately after completion of preparation of a drawing buffer region for a drawing task in a next frame.

20 Claims, 10 Drawing Sheets

(51) Int. Cl.
*G06F 1/3228* (2019.01)
*G06F 9/48* (2006.01)

(58) Field of Classification Search
USPC .................................................. 713/300, 320
See application file for complete search history.

(56) References Cited

U.S. PATENT DOCUMENTS

| | | | |
|---|---|---|---|
| 9,654,372 B2* | 5/2017 | Lumezanu | .......... H04L 43/0852 |
| 2005/0221847 A1 | 10/2005 | Brehler | |
| 2007/0070074 A1 | 3/2007 | Jiang | |
| 2008/0155549 A1 | 6/2008 | Blinick | |
| 2010/0008278 A1 | 1/2010 | Kone | |
| 2012/0127904 A1* | 5/2012 | Tomizawa | ........ H04W 52/0258 |
| | | | 370/311 |
| 2014/0043631 A1 | 2/2014 | Honma et al. | |
| 2014/0181553 A1 | 6/2014 | Eckert et al. | |
| 2014/0354659 A1 | 12/2014 | Apodaca | |
| 2015/0121106 A1 | 4/2015 | Eckert et al. | |
| 2015/0286271 A1 | 10/2015 | Vrind et al. | |

FOREIGN PATENT DOCUMENTS

| | | |
|---|---|---|
| CN | 101951517 A | 1/2011 |
| CN | 101998598 A | 3/2011 |
| CN | 103959197 A | 7/2014 |
| CN | 106095541 A | 11/2016 |
| WO | 2005099107 A1 | 10/2005 |
| WO | 2013081602 A1 | 6/2013 |

OTHER PUBLICATIONS

English Translation of the Written Opinion of the International Search Authority in international application No. PCT/CN2017/086226, dated Sep. 1, 2017.
https://blog.csdn.net/yangwen123/article/details/17090721; Dec. 3, 2013; Happy android; "Android frame buffer status monitoring process source code analysis" p. 1-5.
https://wetest.qq.com/lab/view/28.html; Oct. 21, 2015; kesen; "Android performance optimization model" p. 1-15.
Supplementary European Search Report in European application No. 17805761.8, dated Jun. 14, 2019.

* cited by examiner

SLEEP MANAGEMENT METHOD AND DEVICE, AND COMPUTER STORAGE MEDIUM

CROSS-REFERENCE TO RELATED APPLICATION

The present application is filed based upon and claims benefit to Chinese Patent Application No. 201610377374A, filed on May 31, 2016, the contents of which are hereby incorporated by reference in its entirety.

TECHNICAL FIELD

The disclosure relates to the technical field of control, and in particularly to a method and a device for sleep management and a computer storage medium.

BACKGROUND

For many portable devices (such as mobile phones and tablet computers), there are such a scenario that it is required to perform redrawing or switching between frames. For example, for a mobile phone installed with an Android operating system from Google Inc. of the United States, drawing a next frame of picture by an application (for example, a game) thereon is called invalidating or redrawing. The switching between frames refers to drawing buffer switching between two drawing processes.

Many short sleep generated between two drawing processes may be called light sleep. The light sleep takes time about tens of micro-seconds.

Figure 1:
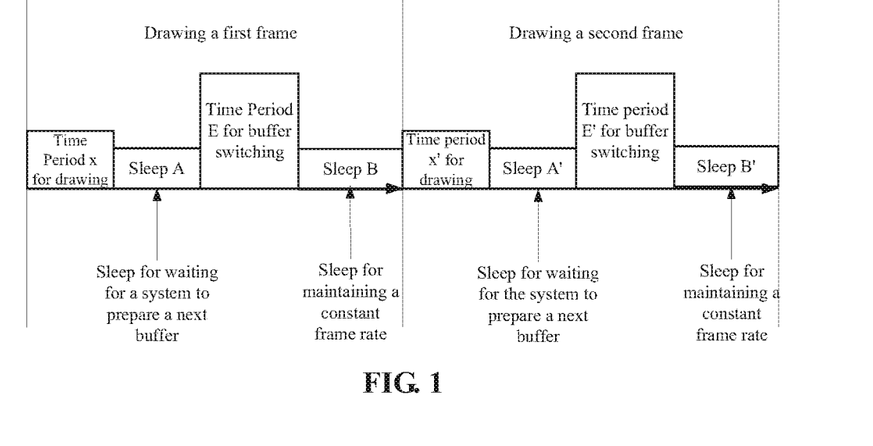
FIGS. 1 and 2 are exemplary flowcharts of a drawing process according to the related art.
Figure 2:
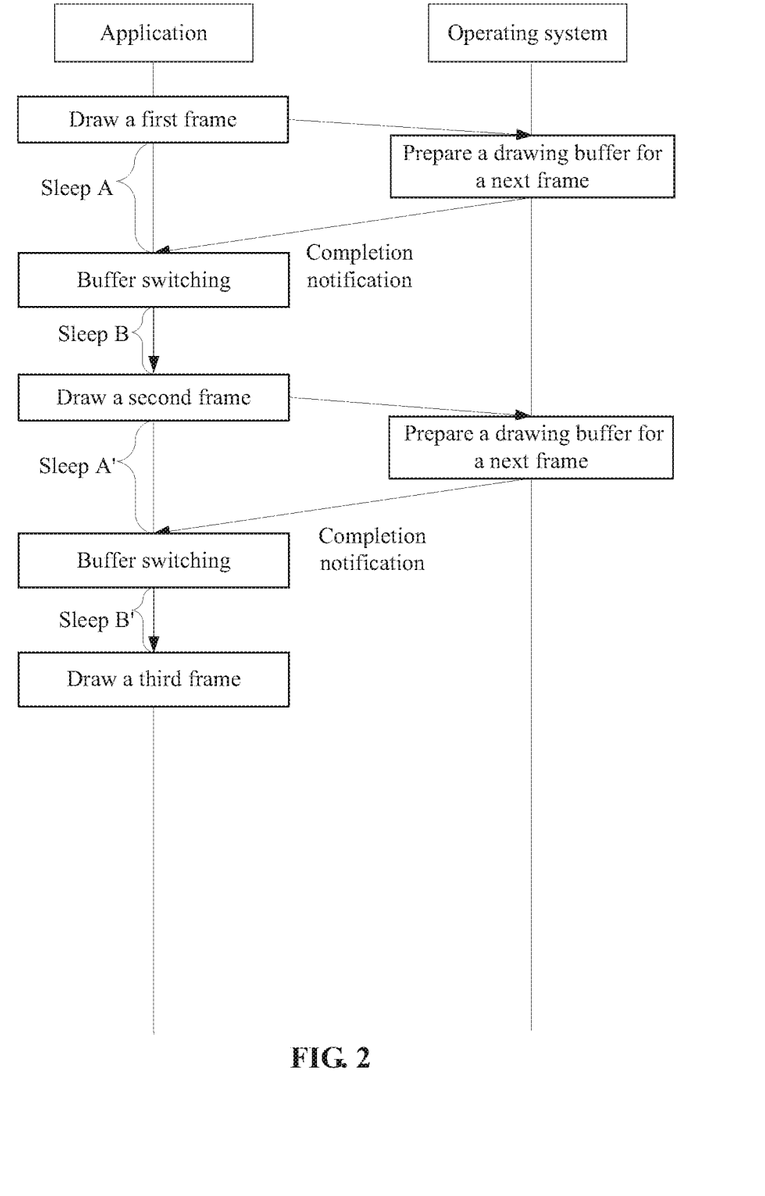

Taking a game application as an example, referring to FIG. 1 and FIG. 2, the game application draws a first frame at first (namely executing a drawing task of a drawing buffer of the first frame). After completion, the game application may wait for a drawing buffer of a next frame to draw a second frame. In a process of waiting for an operating system (such as Android, Windows and MacOS) to prepare a next drawing buffer, the game application enters a first light sleep (i.e., sleep A in FIG. 1) and is suspended. After preparing the next drawing buffer, the operating system sends a completion notification. Upon reception of the completion notification, the game application is switched from a sleep state to an operating state and performs buffer switching (namely formally switching all the drawing instructions to a new buffer, or called real target switching of the drawing instructions).

On the Android operating system, a frame rate of a general application is constantly maintained at 60 fps, and the flame rate of the game application is controlled according to requirements of scenarios. Taking the constant frame rate of 60 fps as an example, a time interval between frames is (1000/60=16.67 ms). After the game application performs buffer switching, the consumed time (a time period x for drawing+sleep duration A+a time period E for buffer switching) may have not reached 16.67 ms. For maintaining the frame rate, the game is required to enter a second light sleep (i.e., sleep B in FIG. 1).

After the sleep B is ended, the second frame is started to be drawn. Similarly, there may be two light sleep during a drawing process of the second frame.

Therefore, in the related art, there may be at least two light sleep during each drawing process, and three state switching operations of drawing→first light sleep→buffer switching-→second light sleep are executed.

It is assumed that a busy state of the operating system is variable, many smaller and shorter light sleep may be often generated, which results in more state switching operations. Switching of the operating state/the sleep state for many times may make the operating system busy and bring unnecessary burdens to the operating system. This is because the state switching means that the operating system is required to perform special processing on the application. For example, when the application enters a sleep state, the operating system must save a state of the application so as to continue execution from the sleep after waking the application up next time. The operating system must organize resources used by the application, for example, a memory, and perform resource reorganization or release.

SUMMARY

In view of this, embodiments of the disclosure provide a method and device for sleep management and a computer storage medium to reduce a light sleep and state switching.

In order to achieve the above-described purpose, the embodiments of the disclosure provide the following technical solutions.

A method for sleep management is provided, which is applied to a terminal and includes the following operations.

After an application completes drawing a current frame, a drawing buffer for drawing a next frame is prepared;

after preparation of the drawing buffer for drawing a next frame is completed, sleep latency time is predicted; and after waiting for the sleep latency time, a completion notification is sent to wake up the application in a sleep state.

In an implementation of the embodiments of the disclosure, the operation that the sleep latency time is predicted may include the following action. The sleep latency time is estimated based on light sleep durations in drawing processes of first n frames, n being a positive integer.

In an implementation of the embodiments of the disclosure, the operation that the sleep latency time is estimated based on the light sleep durations in the drawing processes of the first n frames may include the following actions. Weighted summation is performed on the light sleep durations in the drawing processes of the first n frames, and a result of the weighted summation is used as the sleep latency time.

In an implementation of the embodiments of the disclosure, the operation that the sleep latency time is estimated based on the light sleep durations in the drawing processes of the first n frames may include the following actions. Weighted summation is performed on the light sleep durations in the drawing processes of the first n frames, and a result of the weighted summation is used as the sleep latency time.

In an implementation of the embodiments of the disclosure, the operation that the sleep latency time is estimated based on the light sleep durations in the drawing processes of the first n frames may include the following actions. Weighted summation is performed on the light sleep durations in the drawing processes of the first n frames to obtain a result H of the weighted summation. The result H of the weighted summation is adjusted based on a time period x for drawing the current frame and a time period E for buffer switching of a previous frame to obtain the sleep latency tune.

In an implementation of the embodiments of the disclosure, the operation that the result H of the weighted summation is adjusted based on the time period x for drawing the current frame and the time period E for buffer switching of the previous frame to obtain the sleep latency time may include the following actions. It is determined whether a sum of x, E, H and A0 is equal to T. When it is determined that the sum of x, E, H, and A0 is not equal to T, a value of H is adjusted so that the sum of x, E, H and A0 is equal to T, the adjusted H being the sleep latency time. T represents a time interval between drawing processes of two adjacent frames, and A0 represents sleep duration of the application between a moment of completion of drawing the current frame and a moment of completion of preparation of the drawing buffer for drawing the next frame.

A device for sleep management is provided, which is applied to a terminal and in a preparation unit, a prediction unit and a triggering unit.

The preparation unit is configured to prepare a drawing buffer for drawing a next frame after an application completes drawing a current frame.

The prediction unit is configured to predict sleep latency time after the preparation unit completes preparation.

The triggering unit is configured to send a completion notification to wake up the application in a sleep state after the sleep latency time is elapsed.

In an implementation of the embodiments of the disclosure, on the aspect of predicting the sleep latency time, the prediction unit may be configured to estimate the sleep latency time based on light sleep durations in drawing processes of first n frames, n being a positive integer.

In an implementation of the embodiments of the disclosure, on the aspect of estimating the sleep latency time based on the light sleep durations in the drawing processes of the first n frames, the prediction unit may be configured to perform weighted summation on the light sleep durations in the drawing processes of the first n frames and use a result of the weighted summation as the sleep latency time.

In an implementation of the embodiments of the disclosure, on the aspect of estimating the sleep latency time based on the light sleep durations in the drawing processes of the first n frames, the prediction unit may be configured to perform weighted summation on the light sleep durations in the drawing processes of the first n frames to obtain a result H of the weighted summation, adjust the result H of the weighted summation based on the time period x for drawing the current frame and the time period E for buffer switching of a previous frame to obtain the sleep latency time.

In an implementation of the embodiments of the disclosure, on the aspect of adjusting the result H of the weighted summation based on the time period x for drawing the current frame and the time period E for buffer switching of the previous frame to obtain the sleep latency time, the prediction unit may be configured to: determine whether a sum of x, E, H and A0 is equal to T; when it is determined that the sum of x, E, H and A0 is unequal to T, adjust a value of H so that the sum of x, E, H and A0 is equal to T, the regulated H being the sleep latency time, where T represents a time interval between drawing two adjacent frames, and A0 represents sleep time of the application between a moment of completion of drawing the current frame and a moment of completion of preparation of the drawing buffer for drawing the next frame.

When executing processing, the preparation unit, the prediction unit and the triggering unit may be implemented by a Central Processing Unit (CPU), a Digital Signal Processor (DSP) or a Field-Programmable Gate Array (FPGA).

It is provided a computer storage medium having stored thereon computer-executable instructions, the computer-executable instruction being configured to implement the above-described method for sleep management.

A terminal is provided, which includes the above-described device for sleep management.

The difference between the embodiments of the disclosure and the related art is that, after preparation of the drawing buffer for drawing the next frame is completed, the completion notification is not sent immediately, and the completion notification is sent after predicting and waiting for the sleep latency time D.

From the perspective of the application, it is maintained in the sleep state between a moment of completion of drawing the current frame and a moment of completion of preparation of the drawing buffer for drawing the next frame. It is assumed that sleep duration of the application is A'. Then, the application is still in the sleep state (sleep duration is D) between the moment of completion of preparation of the drawing buffer for drawing the next frame and a moment of reception of the completion notification. That is, continuous sleep duration of the application is A'+D. Therefore, short sleep are merged.

Therefore, according to the embodiments of the disclosure, sleep duration is prolonged, sleep can be prolonged from a light sleep to a deep sleep, and the deep sleep can enable an operating system to release more resources and loads. Moreover, since the sleep duration is prolonged, the number of sleep can be reduced, thereby state switching can be reduced, and a busy state and burden of the operating system caused by frequent state switching can be reduced.

BRIEF DESCRIPTION OF DRAWINGS

In order to describe the technical solutions in the embodiments of the disclosure or the related art more clearly, the drawings used in the embodiments or description of the related art will be simply introduced below. It is apparent that the drawings described below are only the embodiments of the disclosure, Other drawings may further be obtained by those skilled in the art according to the provided drawings without creative work.

DETAILED DESCRIPTION

It is mentioned above that many light sleep are generated between two drawing processes, for example, sleep B generated to achieve a constant frame rate, sleep A for waiting for an operating system to prepare a next drawing buffer, and other sleep generated for waiting for operations. It may cause multiple state switching operations, which is not good for releasing the resources and loads.

The disclosure provides a method for sleep management, a device for sleep management and a terminal to solve the above-described problem.

The above-described method and device for sleep management may be applied to a portable device (such as, a mobile phone, a tablet computer and a game console).

The device for sleep management may implement the above-described method for sleep management as a module or a component of an operating system (for example, a Surfaceflinger component of an Android system and a GWES component of a Windows system). Or, for an application, it may also be considered that the operating system implements the above-described method for sleep management.

The above-described method for sleep management will be introduced below by taking drawing two frames (called drawing a first frame and drawing a second frame below) as an example.

Figure 3:
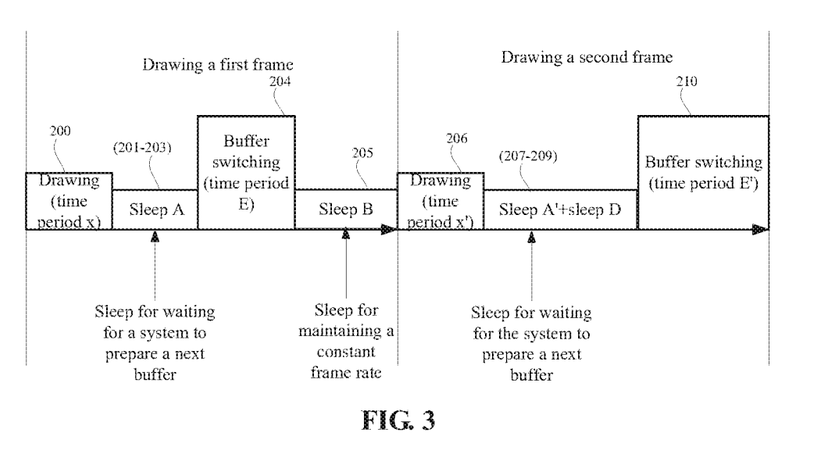
FIGS. 3, 4, 5, 6, 7 and 8 are exemplary flowcharts of a method for sleep management according to an embodiment of the disclosure.
Figure 4:
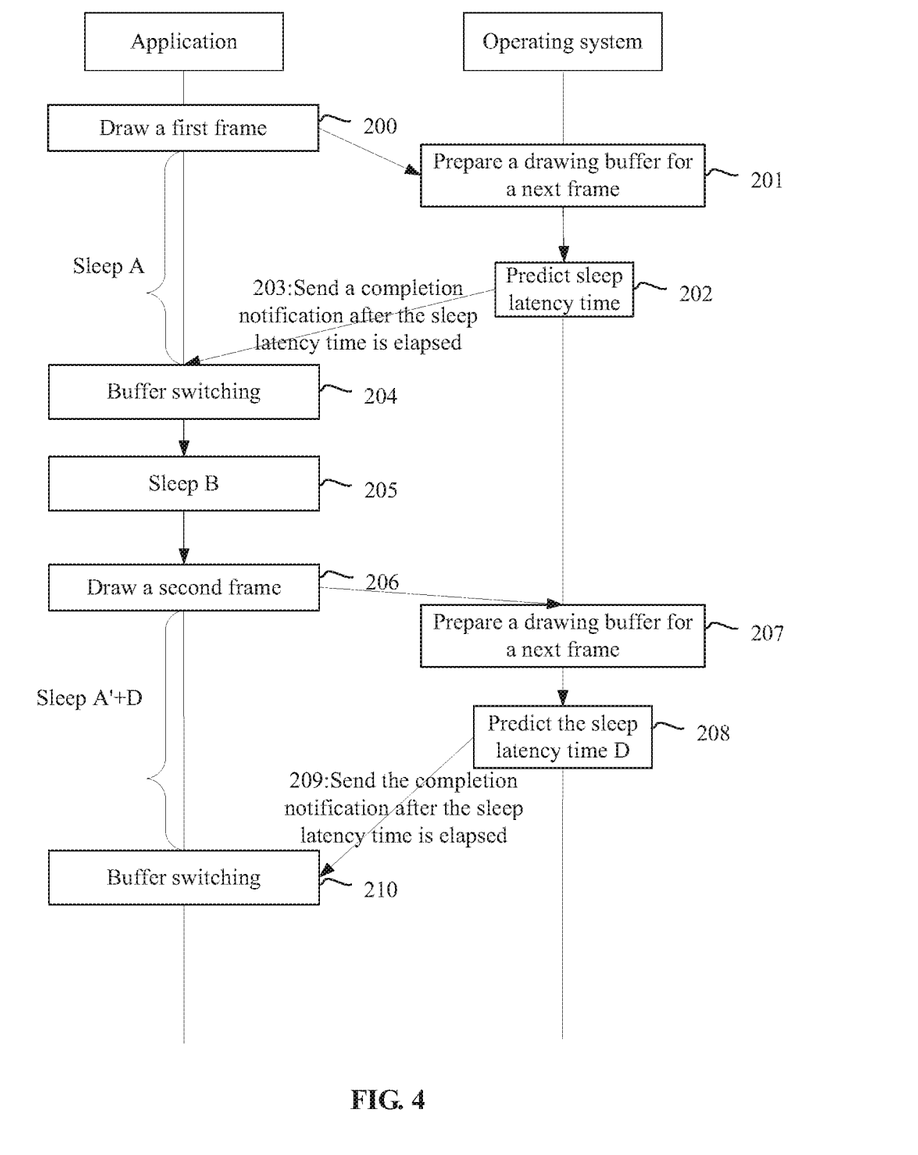

FIG. 3 and FIG. 4 illustrate an exemplary flow of the above-described method for sleep management. The method may at least include the following operations.

In 200, an application draws a current frame (which is the first frame at this moment).

A drawing method for the application (for example, an application program running on an Android system) refers to the related art and will not be described herein.

After the current frame is drawn, the application notifies the operating system to perform buffer switching and submits a drawn buffer result to the operating system. The result is finally outputted to a screen.

In 201, the device for sleep management (the operating system) prepares a drawing buffer for drawing a next frame.

In 201, the application enters a sleep state.

In 202, after preparation of the drawing buffer for drawing the next frame is completed, the device for sleep management (the operating system) predicts sleep latency time.

In an example, historical light sleep duration may be acquired and then the sleep latency time is estimated based on the historical light sleep duration.

However, in the embodiment, since an operation of block 202 is executed in a drawing process of the first frame, it is impossible to acquire the historical light sleep duration. In such case, the sleep latency time may be set to 0. Of course, a factory setting value or a default value may also be used as the sleep latency time.

In 203, after the sleep latency time is elapsed, the device for sleep management (the operating system) sends a completion notification to wake up the above application in a sleep state.

The above-described completion notification configured to wake up the above application in the sleep state.

It is to be noted that, different from the related art, in the embodiments of the disclosure, after preparation of the drawing buffer for drawing the next frame is completed, the completion notification is not sent immediately, and the completion notification is sent after predicting and waiting for the sleep latency time.

It is assumed that the sleep latency time predicted in 202 is 0, the completion notification is sent immediately when preparation of the drawing buffer for drawing the next frame is completed in 203.

More specifically, for the Android system, the application mainly interacts with a Surfaceflinger system component of the Android system in the drawing process, and the Surfaceflinger system component sends the completion notification to wake the application up. For the Windows system, the application interacts with a GWES system component of the Windows system, and the GWES system component sends the completion notification to the wake the application up.

In 204, the application receiving the completion notification performs buffer switching, namely switching a drawing instruction to the new buffer, to continue drawing the next frame.

It is to be noted that both buffer switching and drawing take certain time.

It is also to be noted that, in an actual scenario, a mutual interaction (one makes a request and waits, and the other executes a corresponding operation and gives a response) is performed between the application (for example, a game application) and the system component (for example, Surfaceflinger for Android) or a Graphics Processing Unit (GPU).

Taking the Android system as an example, a process of drawing the current frame in 200 or 206 is completed by the mutual interaction between the application and the GPU (drawing in a buffer for which independently applied to the Surfaceflinger by the application).

The Surfaceflinger is responsible for rendering, superposing and outputting all the buffers submitted by the application to the screen, switching to a next drawing buffer, and waking the application up after the sleep latency time is elapsed. Then, the game application may draw a next frame.

In 205, the application enters a light sleep (the sleep B) to maintain a frame rate.

It is to be noted that, in a first drawing process, the sleep latency tune may not be accurately predicted, and one more light sleep may be performed after the buffer switching.

Taking a constant frame rate of 60 fps as an example, a time interval between frames is (1000/60=16.67 ms). After the application completes buffer switching, the consumed time (a time period x for drawing±sleep duration A+a time period E for buffer switching) may have yet not reach 16.67 ms. For maintaining the frame rate, the application is required to enter the sleep B.

In 206, the application draws a current frame (which is drawing the second frame at this moment).

In 207, the device for sleep management (the operating system) prepares the drawing buffer for drawing a next frame.

The application enters the sleep state in 207.

In 208, after preparation of the drawing buffer for drawing the next frame is completed, the device for sleep management (the operating system) predicts the sleep latency time.

In an example, the historical light sleep duration may be acquired and then the sleep latency time is estimated based on the historical light sleep duration. More specifically, the historical light sleep duration may refer to light sleep duration after the buffer switching.

Due to drawing the second frame, the sleep latency time may be predicted with reference to the light sleep duration (i.e., the sleep B) in the drawing process of the first frame.

In 209, after the sleep latency time is elapsed, the device for sleep management (the operating system) sends a completion notification. The above-described completion notification is configured to wake up the application in the sleep state.

In 210, the application performs the buffer switching.

Specifically, the application receiving the completion notification stops sleeping and performs the buffer switching.

It is assumed that a length of the sleep latency time predicted in the drawing process of the second frame is D. From the perspective of the application, it is maintained in the sleep state between a moment of completion of drawing the second frame and a moment of completion of preparation of the drawing buffer for drawing the next frame. It is assumed that sleep duration of the application is A'. Then, the application is still in the sleep state (the sleep duration is D) between the moment of completion of preparation of the drawing buffer for drawing the next frame and a moment of reception of the completion notification. That is, continuous sleep duration of the application is A'+D. Compared with the related art and the drawing process of the first frame, short sleep (A' and D) are merged to a certain extent, and sleep of the application for waiting for the operating system to prepare the next buffer is prolonged. Accordingly, the application may not enter a short sleep again after the buffer switching, thereby prolonging sleep from a light sleep to a deep sleep.

The deep sleep can enable the operating system to release more resources and loads. Moreover, since the sleep duration is prolonged, the number of sleep can be reduced, thereby state switching can be reduced, a busy state and burden of the operating system caused by frequent state switching can be reduced, and purposes of optimization and power saving of the operating system can be achieved.

Since there is not much historical light sleep duration data which can be referred to in the early stage, the sleep latency time may not be predicted accurately by using the above method for sleep management in the early stage. With increase of the number of the drawn frames, there may be gradually increased historical light sleep duration data which may be referred to, and the sleep latency time can be predicted more accurately. Accordingly, an advantage of the method for sleep management claimed in the embodiments of the disclosure in tens of sleep duration optimization will become more obvious.

Figure 5:
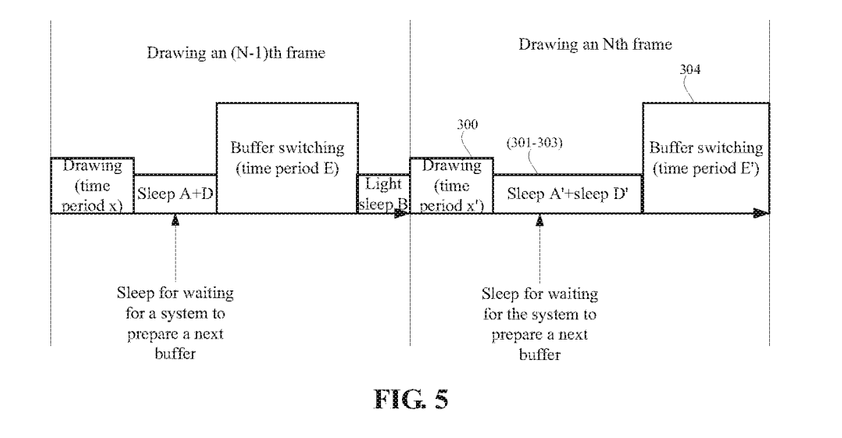
Figure 6:
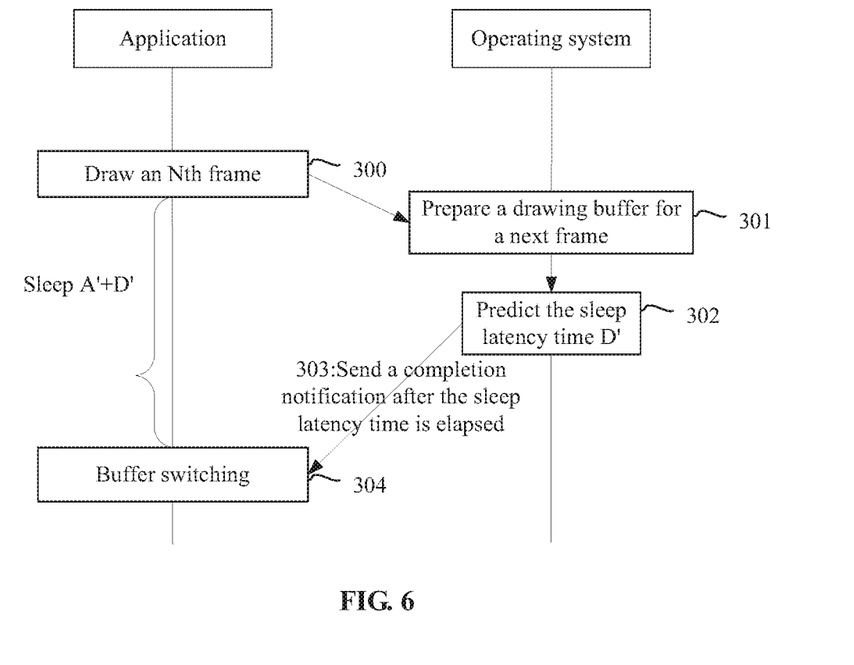

The method for sleep management will be introduced in more detail below by taking a drawing process of an Nth frame (N is not smaller than 4) as an example. Referring to FIG. 5 and FIG. 6, the method may at least include the following operations.

In 300, the application draws a current frame (which is the Nth frame at this moment).

After a drawing process of the current frame is completed, the application notifies the operating system to perform buffer switching and submits a drawn buffer result to the operating system, and the result is finally outputted to the screen.

Block 300 is similar to the above block 200 or 206 and will not be described herein.

In 301, the device for sleep management (the operating system) prepares a drawing buffer for drawing a next frame.

Block 301 is similar to the above block 201 or 207 and will not be described herein.

In 302, after preparation of e drawing buffer for drawing the next frame is completed, the device for sleep management (the operating system) estimates sleep latency time D' based on light sleep durations in drawing processes of first n frames (n is a positive integer).

In an example, weighted summation may be performed on the light sleep durations in the drawing processes of the first n frames, and a result of the weighted summation may be used as the sleep latency time.

More specifically, the historical light sleep duration may refer to light sleep duration after the buffer switching.

In the embodiment, a value of n may be 3. Of course, those skilled in the art may design the value of n according to actual needs and no more description will be made herein.

It is assumed that light sleep durations of first three frames are c1, c2 and c3 respectively, c1 being the light sleep duration of the last frame (i.e., an (N–1)th frame) and c3 being the light sleep duration of an (N–3)th frame.

Then, the sleep latency time D' can be calculated by using the following formula:

$$D'=w1*D1+w2*D2+w3*D3.$$

More specifically, $w1+w2+w3=1$ and $w1>w2>w3$. $w1>w2>w3$ represents that a reference value of the light sleep duration of the most recent frame is higher.

In 303, after the sleep latency time is elapsed, the device for sleep management (the operating system) sends a completion notification.

In 304, the application receiving the completion notification performs buffer switching (namely switching a drawing instruction to a new buffer to continue drawing a next frame).

Blocks 303 and 304 are similar to the above blocks 209 and 210 respectively and will not be described herein.

In the embodiment, the sleep latency time is estimated based on the light sleep durations in the drawing processes of the first n frames (n is a positive integer) so that the sleep latency time can be predicted more reasonably.

Figure 7:
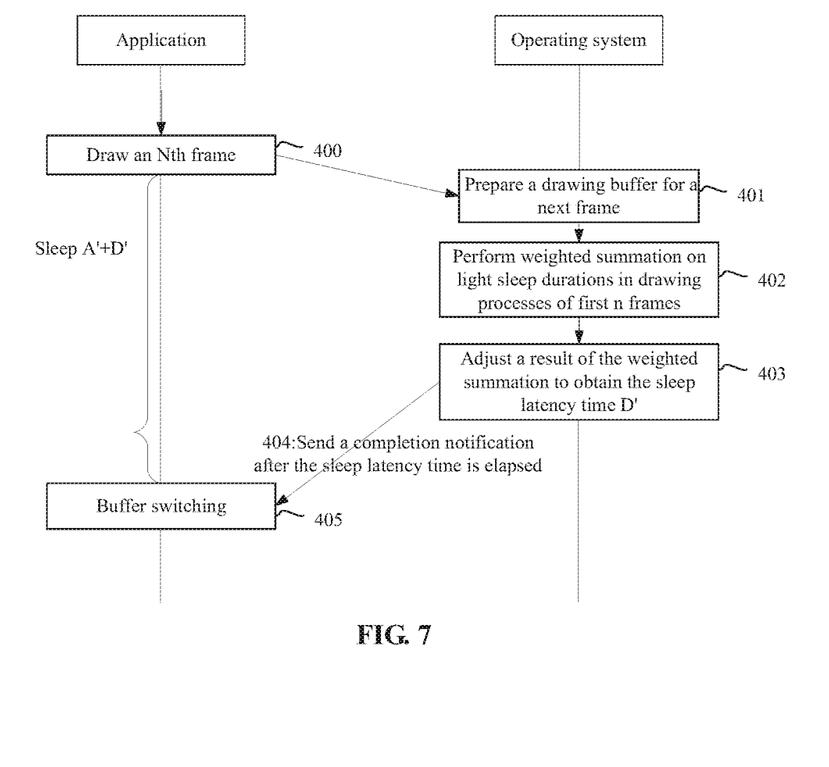

FIG. 7 illustrates another exemplary flow of the above-described method for sleep management. The method may at least include the following operations.

In 400, an application draws an Nth frame.

Block 400 is similar to the above blocks 300, 200 and 206 and will not be described herein.

In 401, the device for sleep management (the operating system) prepares a drawing buffer for drawing a next frame.

Block 401 is similar to the above block 201, 207 or 301 and will not be described herein.

In 402, after preparation of the drawing buffer for drawing the next frame is completed, weighted summation is performed on light sleep durations in drawing processes of first n frames to obtain a result H of the weighted summation.

In the embodiment, a value of n may be 3. Of course, those skilled in the art may design the value of n according to actual needs and no more description will be made herein.

It is assumed that the light sleep durations of the first three frames are c1, c2 and c3 respectively, c1 being the light sleep duration of the last frame (i.e., an (N–1)th frame) and c3 being the light sleep duration of an (N–3)th frame.

Then, H can be calculated by using the following formula:

$$H=w1*D1+w*D2+w3*D3.$$

More specifically, $w1\pm w2+w3=1$ and $w1>w2>w3$. $w1>w2>w3$ represents that a reference value of the light sleep duration of the most recent frame is higher.

In 403, the result H of the weighted summation is adjusted based on the time period x for drawing the current frame and the time period E for buffer switching a previous frame to obtain the sleep latency time D'.

Time for drawing each frame may be different and time for buffer switching of each frame may also be different. Therefore, in the embodiment, the time period x for drawing the current frame and the time period E for buffer switching of the previous frame are introduced to adjust the result H of the weighted summation to obtain a more reasonable sleep latency time.

In 404, after the sleep latency time is elapsed, the device for sleep management (the operating system) sends a completion notification.

Block 404 is similar to the above blocks 209 and 303 and will not be described herein.

In 405, the application receiving the completion notification performs buffer switching.

Block 405 is similar to the above blocks 209, 210 and 304 and will not be described herein.

Figure 8:
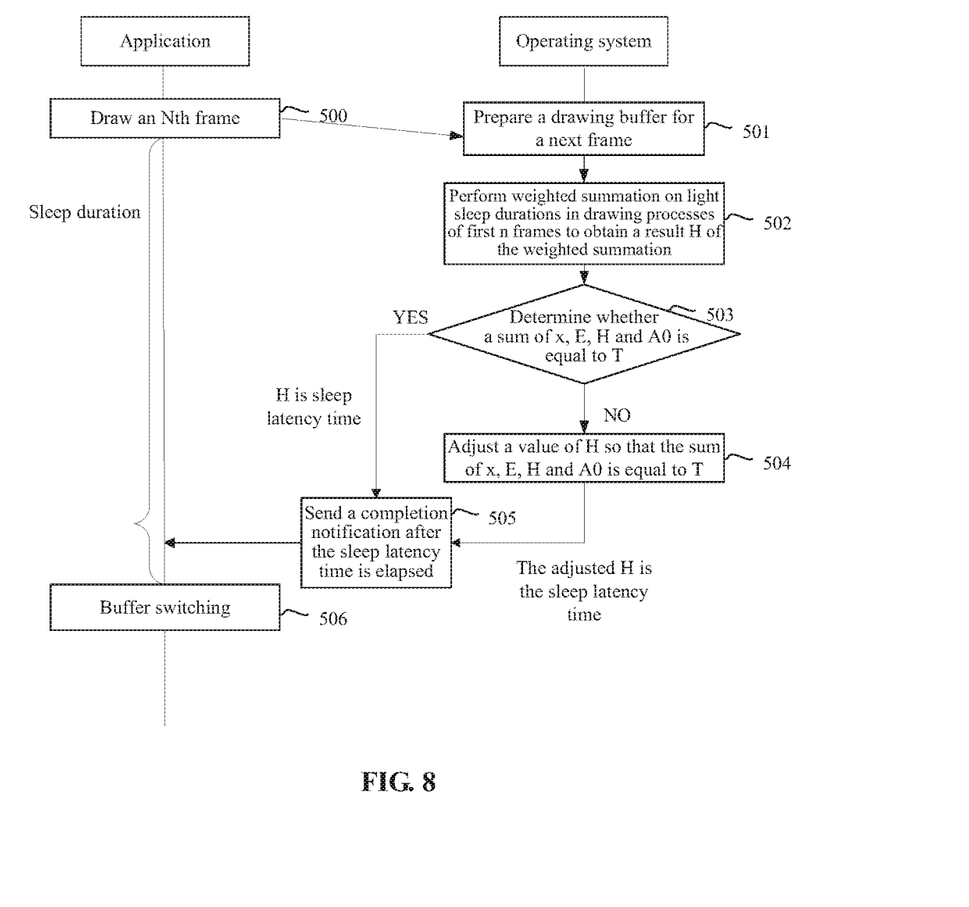

How to adjust the result of the weighted summation will be introduced below by using a more detailed embodiment. Referring to FIG. 8, FIG. 8 illustrates another exemplary flow of the above-described method for sleep management. The method may at least include the following operations.

Blocks 500 to 502 may be referred to blocks 400 to 402 illustrated in FIG. 4 and will not be described herein.

In 503, it is determined whether a sum of the time period x for drawing the current frame, the time period E for buffer switching of the previous frame, the result H of the weighted summation and A0 is equal to T. When it is determined the stun is equal to T, an operation of block 505 is executed; otherwise an operation of block 504 is executed.

Specifically, T represents a time interval between drawing processes of two adjacent frames. Taking a constant frame rate of 60 fps as an example, T=16.67 ins.

A0 represents sleep duration of the application between a moment of completion of drawing the current frame and a moment of completion of preparation of the drawing buffer for drawing the next frame, time for execution of an operation of block 501.

In 504, a value of H is adjusted so that the sum of x, E, H and A0 is equal to T, and the adjusted H is used as the sleep latency time.

In 505, after the sleep latency time is elapsed, the device for sleep management (the operating system) sends a completion notification.

Block 505 is similar to the above blocks 209, 303 and 404 and will not be described herein.

In 506, the application receiving the completion notification performs buffer switching.

Block 506 is similar to the above blocks 209, 210, 304 and 405 and will not be described herein.

In the embodiment, the H is adjusted so that the sum of x, E, H and A0 is equal to T, thereby the frame rate can be maintained as constant as possible.

Figure 9:
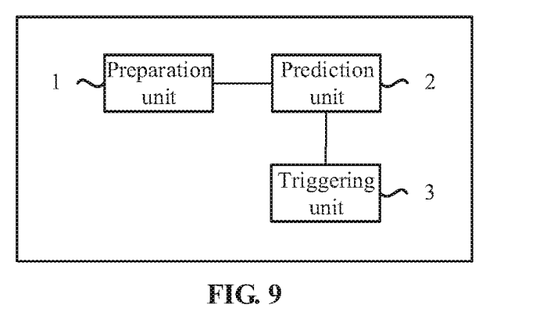
FIG. 9 is an exemplary structure diagram of a device for sleep management according to an embodiment of the disclosure.

FIG. 9 illustrates an exemplary structure of the above-described device for sleep management, which may include a preparation unit 1, a prediction unit 2 and a triggering unit 3.

The preparation unit 1 is configured to prepare a drawing buffer for drawing a next frame after an application completes drawing a present frame.

The preparation unit 1 may execute operations of blocks 201 and 207 illustrated in FIG. 3 and FIG. 4, block 301 illustrated in FIG. 5 and FIG. 6, block 401 illustrated in FIG. 7 and block 501 illustrated in FIG. 8.

The prediction unit 2 is configured to predict sleep late e after the preparation unit 1 completes preparation.

The prediction unit 2 may execute operations of blocks 202 and 208 illustrated in FIG. 3 and FIG. 4, block 302 illustrated in FIG. 5 and FIG. 6, blocks 402 and 403 illustrated in FIG. 7 and blocks 502 to 504 illustrated in FIG. 8.

The triggering unit 3 is configured to send a completion notification to wake up the application in a sleep state after the sleep latency time is elapsed.

The preparation unit 3 may execute operations of blocks 203 and 209 illustrated in FIG. 3 and FIG. 4, block 303 illustrated in FIG. 5 and FIG. 6, block 404 illustrated in FIG. 4 and block 505 illustrated in FIG. 5.

The embodiments of the disclosure provide a computer storage medium having stored thereon computer-executable instructions, the computer-executable instruction being configured to implement the above-described method for sleep management.

The embodiments of the disclosure further claim a text may include the above-described device for sleep management.

Figure 10:
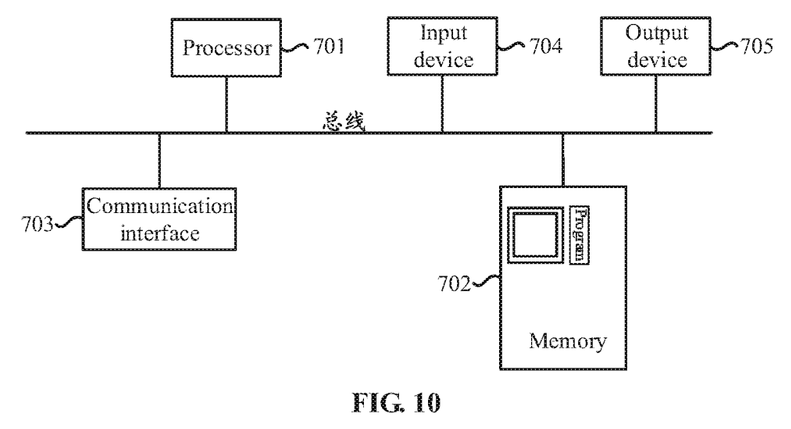
FIG. 10 is an exemplary structure diagram of a terminal according to an embodiment of the disclosure.

FIG. 10 illustrates a structure of a general computer system of the above-described terminal.

The above-described computer system may include a bus, a processor 701, a memory 702, a communication interface 703, an input device 704 and an output device 705. The processor 701, the memory 702, the communication interface 703, the input device 704 and the output device 705 are connected to each other through the bus.

Specifically, the bus may include a path to transmit information between the components of the computer system.

The processor 701 may be a general-purpose processor, such as, a general-purpose CPU, a Network Processor (NP) and a microprocessor, and may also be an application-specific integrated circuit (ASIC), or one or more integrated circuits configured to control a program execution of a solution of the disclosure. The processor 701 may also be a DSP, an ASIC, an FPGA or other programmable logic device, a discrete gate, a transistor logic device or a discrete hardware component.

The processor 701 may at least include a main processor and a GPU.

The memory 702 stores programs executing the technical solutions of the disclosure, and may also store an operating system and other critical traffic. Specifically, the program may include a program code and the program code includes computer operating instructions. More specifically, the memory 702 may include a Read-Only Memory (ROM), other types of static storage devices capable of storing static information and instructions, a Random Access Memory (RAM), other types of dynamic storage devices capable of storing information and instructions, a disk memory, a flash and the like.

The input device 704 may include an apparatus receiving data and information inputted by a user, such as, a keyboard, a mouse, a camera, a scanner, a light pen, a voice input device, a touch screen, a pedometer or a gravity sensor.

The output device 705 may include an apparatus allowing outputting information to the user, such as, a display screen, a printer and a loudspeaker.

The communication interface 703 may include a type of apparatus using any transceiver for communication with other devices or communication networks, such as, the Ethernet, a Radio Access Network (RAN) and a Wireless Local Area Network (WLAN).

The processor 701 executes the programs stored in the memory 702, calls other devices, and may be configured to implement each step in the method for sleep management in the above embodiments of the disclosure.

The embodiments in the specification are described in a progressive manner. Each embodiment focuses on differences from other embodiments, and the same or similar parts between the embodiments may be referred to each other. The device disclosed in the embodiments corresponds to the method disclosed in the embodiments and thus is described relatively simply, and the related parts can be referred to the part of description of the method.

Those skilled in the art may further appreciate that, the units and algorithm steps of the examples described in combination with the embodiments disclosed in the disclosure may be implemented by electronic hardware, computer software or a combination of both. For clearly describing e exchangeability of hardware and software, the compositions and steps of the examples have been generally described in terms of function in the above description. Whether these functions are executed in a hardware or software depends on specific applications and design constraints of the technical solution. Those skilled in the art can implement the described functions for each specific application by using different methods, but such implementation should not be considered to go beyond the scope of the disclosure.

The steps of the method or algorithm described in combination with the embodiments disclosed in the disclosure may directly be implemented by hardware, a software module executed by a processor or a combination of both. The software module may be arranged in a RAM, a memory, a ROM, an electrically programmable ROM, an electrically erasable programmable ROM, a register, a hard disk, a removable disk, a Compact Disc Read-Only Memory (CD-ROM) or a storage medium in any form well known in the related art.

The above description of the disclosed embodiments enables those skilled in the art to implement or use the disclosure. It is apparent that those skilled in the art can make various modifications to these embodiments. The general principle defined in the disclosure may be implemented in other embodiments without departing from the spirit or scope of the disclosure, Therefore, the disclosure will not be limited to these embodiments shown in the disclosure and conforms to the widest scope consistent with the principle and novel characteristics disclosed in the disclosure.

INDUSTRIAL APPLICABILITY

According to the embodiments of the disclosure, after a drawing process of a current frame is completed, a drawing buffer for drawing a next frame is prepared; after preparation of the drawing buffer is completed, sleep latency time D is predicted; and after the sleep latency time D is elapsed, a completion notification is sent to wake up an application in a sleep state. Compared with the related art, in the embodiments of the disclosure, after preparation of the drawing buffer for drawing the next frame is completed, the completion notification is not sent immediately, and the completion notification is sent after predicting and waiting for the sleep latency time D. Accordingly, sleep can be prolonged from a light sleep to a deep sleep, and the deep sleep can enable the operating system to release more resources and loads. Moreover, the number of sleep can be reduced and thus state switching can be reduced, thereby reducing the burden caused by frequent state switching.

The invention claimed is:

1. A method for sleep management, applied to a terminal and comprising:
after an application completes drawing a present frame, notifying, by the application, an operating system to perform buffer switching, submitting a drawn buffer result to the operating system, outputting the drawn buffer result to a screen, and preparing a drawing buffer for drawing a next frame;
after preparation of the drawing buffer for drawing the next frame is completed, predicting sleep latency time; and
after the sleep latency time is elapsed, sending a completion notification to wake up the application in a sleep state to perform buffer switching.

2. The method of claim 1, wherein predicting the sleep latency time comprises:
estimating the sleep latency time based on light sleep durations in drawing processes of first n frames, n being a positive integer.

3. The method of claim 2, wherein estimating the sleep latency time based on the light sleep durations in the drawing processes of the first n frames comprises:
performing weighted summation on the light sleep durations in the drawing processes of the first n frames and using a result of the weighted summation as the sleep latency time.

4. The method of claim 2, wherein estimating the sleep latency time based on the light sleep durations in the drawing processes of the first n frames comprises:
performing weighted summation on the light sleep durations in the drawing processes of the first n frames to obtain a result H of the weighted summation; and
adjusting the result H of the weighted summation based on a time period x for drawing a present frame and a time period E for buffer switching of a previous frame to obtain the sleep latency time.

5. The method of claim 4, wherein adjusting the result H of the weighted summation based on the time period x for drawing the present frame and the time period E for buffer switching of the previous frame to obtain the sleep latency time comprise:
determining whether a sum of x, E, H and A0 is equal to T; and
when determining that the sum of x, E, H and A0 is not equal to T, adjusting a value of H to make the sum of x, E, H and A0 equal to T, and using the adjusted H as the sleep latency time,
where T represents a time interval between drawing processes of two adjacent frames, and A0 represents sleep duration of the application between a moment of completion of drawing the present frame and a moment of completion of preparation of the drawing buffer for drawing the next frame.

6. The method of claim 1, wherein, when the operating system prepares the drawing buffer for drawing the next frame, the application enters the sleep state.

7. The method of claim 1, wherein, when the present frame is a first frame, the sleep latency time is set to 0, or a factory setting value or a default value is used as the sleep latency time.

8. A device for sleep management, applied to a terminal and comprising:
a processor; and
a memory storing instructions, which, when executed by the processor, cause the processor to execute operations comprising:
after an application completes drawing a present frame, notifying, by the application, an operating system to perform buffer switching, submitting a drawn buffer result to the operating system, outputting the drawn buffer result to a screen, and preparing a drawing buffer for drawing a next frame;
after completing preparation, predicting sleep latency time; and
after the sleep latency time is elapsed, sending a completion notification to wake up the application in a sleep state to perform buffer switching.

9. The device of claim 8, wherein, when predicting the sleep latency time, the processor is configured to estimate the sleep latency time based on light sleep durations in drawing processes of first n frames, n being a positive integer.

10. The device of claim 9, wherein, when estimating the sleep latency time based on the light sleep durations in the drawing processes of the first n frames, the processor is configured to:

perform weighted summation on the light sleep durations in the drawing processes of the first n frames and use a result of the weighted summation as the sleep latency time.

11. The device of claim 9, wherein, when estimating the sleep latency time based on the light sleep durations in the drawing processes of the first n frames, the processor is configured to:
perform weighted summation on the light sleep durations in the drawing processes of the first n frames to obtain a result H of the weighted summation; and
adjust the result H of the weighted summation based on a time period x for drawing the present frame and a time period E for buffer switching of a previous frame to obtain the sleep latency time.

12. The device of claim 11, wherein, when adjusting the result H of the weighted summation based on the time period x for drawing the present frame and the time period E for buffer switching of the previous frame to obtain the sleep latency time, the processor is configured to:
determine whether a sum of x, E, H and A0 is equal to T; and
when determining that the sum of x, E, H and A0 is not equal to T, adjust a value of H to make the sum of x, E, H and A0 equal to T, and use the adjusted H as the sleep latency time,
where T represents a time interval between drawing processes of two adjacent frames, and A0 represents sleep duration of the application between a moment of completion of drawing the present frame and a moment of completion of preparation of the drawing buffer for drawing the next frame.

13. The device of claim 8, wherein, when the operating system prepares the drawing buffer for drawing the next frame, the application enters the sleep state.

14. The device of claim 8, wherein, when the present frame is a first frame, the sleep latency time is set to 0, or a factory setting value or a default value is used as the sleep latency time.

15. The device of claim 8, wherein the device is configured to implement a method for sleep management as a component of the operating system.

16. A terminal, comprising a device for sleep management, wherein the device is applied to a terminal and comprises:
a processor; and
a memory storing instructions, which, when executed by the processor, cause the processor to execute operations comprising:
after an application completes drawing a present frame, notifying, by the application, an operating system to perform buffer switching, submitting a drawn buffer result to the operating system, outputting the drawn buffer result to a screen, and preparing a drawing buffer for drawing a next frame;
after completing preparation, predicting sleep latency time; and
after the sleep latency time is elapsed, sending a completion notification to wake up the application in a sleep state to perform buffer switching.

17. The terminal of claim 16, wherein, when predicting the sleep latency time, the processor is configured to estimate the sleep latency time based on light sleep durations in drawing processes of first n frames, n being a positive integer.

18. The terminal of claim 17, wherein, when estimating the sleep latency time based on the light sleep durations in the drawing processes of the first n frames, the processor is configured to:
perform weighted summation on the light sleep durations in the drawing processes of the first n frames and use a result of the weighted summation as the sleep latency time.

19. The terminal of claim 17, wherein, when estimating the sleep latency time based on the light sleep durations in the drawing processes of the first n frames, the processor is configured to:
perform weighted summation on the light sleep durations in the drawing processes of the first n frames to obtain a result H of the weighted summation; and
adjust the result H of the weighted summation based on a time period x for drawing the present frame and a time period E for buffer switching of a previous frame to obtain the sleep latency time.

20. The terminal of claim 19, wherein, when adjusting the result H of the weighted summation based on the time period x for drawing the present frame and the time period E for buffer switching of the previous frame to obtain the sleep latency time, the processor is configured to:
determine whether a sum of x, E, H and A0 is equal to T; and
when determining that the sum of x, E, H and A0 is not equal to T, adjust a value of H to make the sum of x, E, H and A0 equal to T, and use the adjusted H as the sleep latency time,
where T represents a time interval between drawing processes of two adjacent frames, and A0 represents sleep duration of the application between a moment of completion of drawing the present frame and a moment of completion of preparation of the drawing buffer for drawing the next frame.

* * * * *